Feb. 27, 1968   J. S. SENEY   3,371,191
ELECTRIC HEATER CONTROL CIRCUIT
Filed Sept. 12, 1966   3 Sheets-Sheet 1

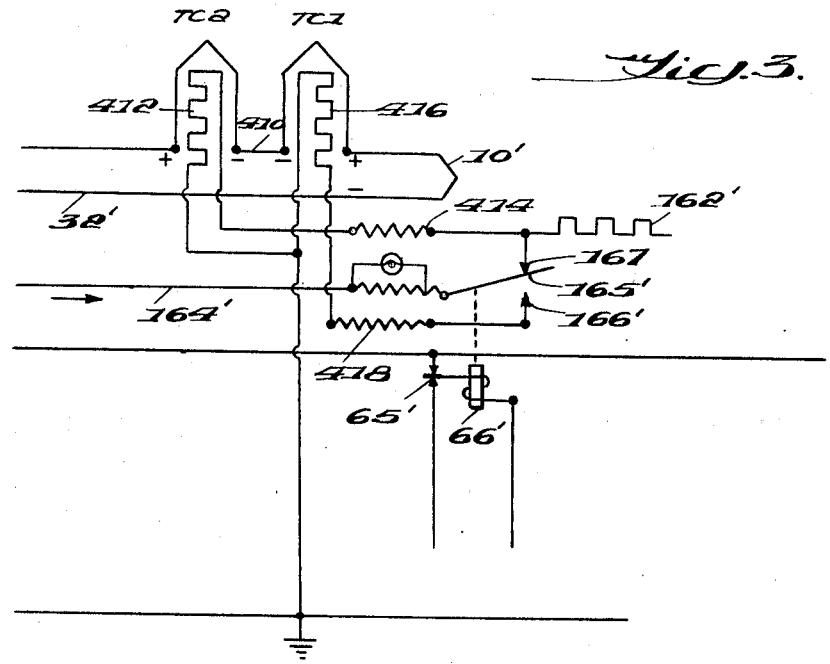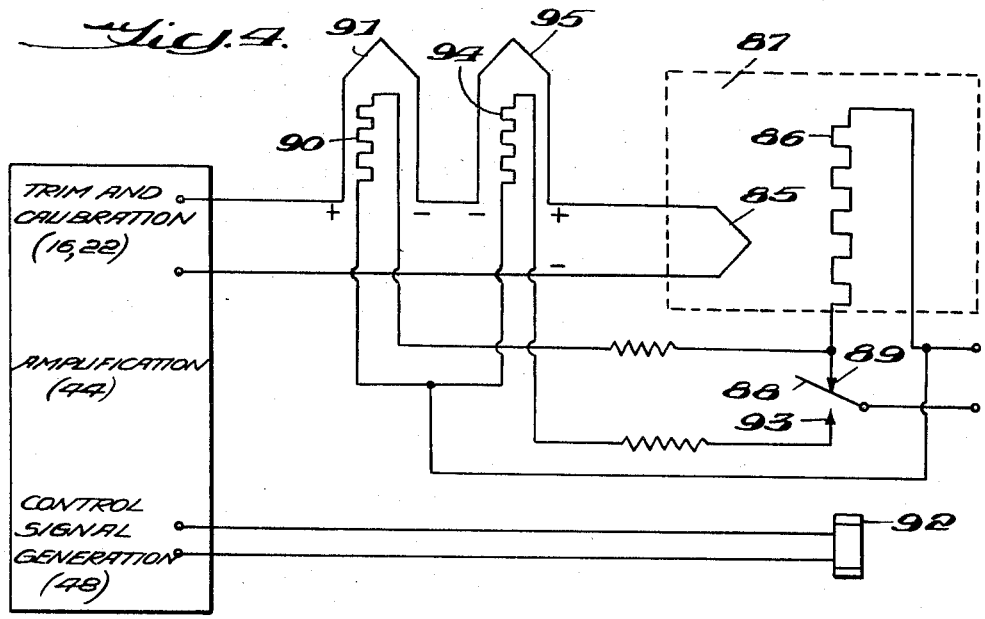

_United States Patent Office_

3,371,191
Patented Feb. 27, 1968

3,371,191
ELECTRIC HEATER CONTROL CIRCUIT
John Seymour Seney, Seaford, Del., assignor to E. I. du Pont de Nemours and Company, Wilmington, Del., a corporation of Delaware
Continuation-in-part of application Ser. No. 838,985, Sept. 9, 1959. This application Sept. 12, 1966, Ser. No. 578,680
3 Claims. (Cl. 219—511)

ABSTRACT OF THE DISCLOSURE

A temperature control system, which includes an electric heater, a primary temperature sensor, and a switch in the heater circuit coupled to the sensor, is stabilized by a pair of feedback sensors in a circuit with the primary sensor and a pair of heater elements, one for each feedback sensor. Each heater element is selectively energized by means of the primary heater switch and thereby includes a feedback increment in the primary sensed signal.

---

This is a continuation-in-part directed to subject matter divided from my copending application Serial No. 838,-985, filed Sept. 9, 1959, now U.S. Patent No. 3,272,012.

With the ever increasing number of variable conditions in modern manufacturing processes, centralized supervision of these conditions has become a necessity. The details of a multi-point system for controlling a plurality of such conditions have been disclosed in the above-identified patent. Thermally associated with each condition, there is an electrical heater and a sensor. This invention relates to circuitry for stabilizing the operation of a sensor.

The various objectives and advantages disclosed herein have been achieved in a control system which includes an electric heater connected to a source of alternating current (AC), a primary temperature sensor associated with the heater, a switch in the heater circuit and a switch control device coupled electrically to the primary sensor. System operation has been stabilized by provision of a pair of feedback sensors in circuit with the primary sensor and a heater element associated with each feedback sensor. The system switch is pivotable between a first contact in the heater circuit and a second contact. Each heater element is connected to one of the contacts for influencing the primary sensor and thereby including a feedback increment in the primary sensed signal.

Figure 1:
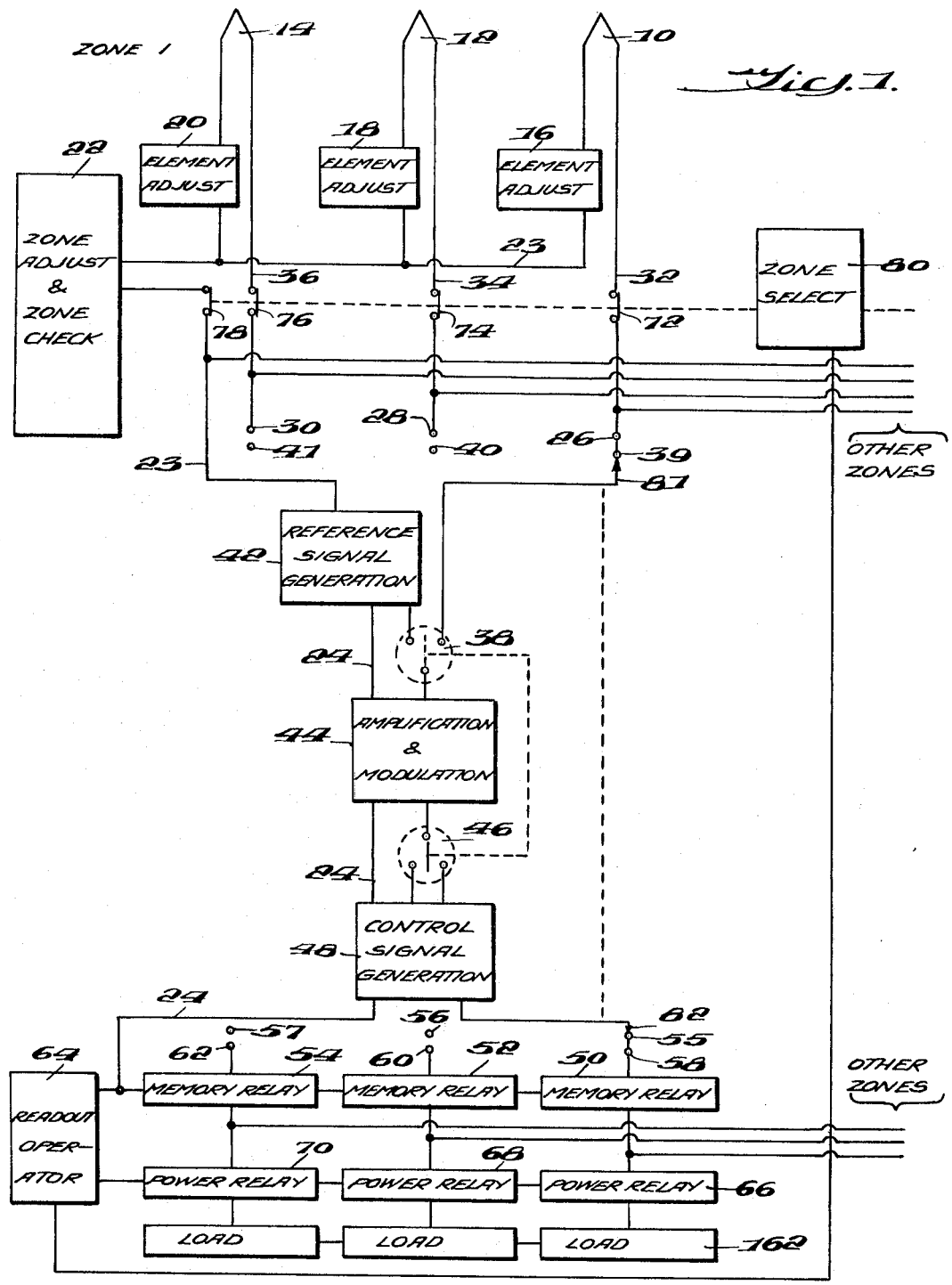
Figure 2:
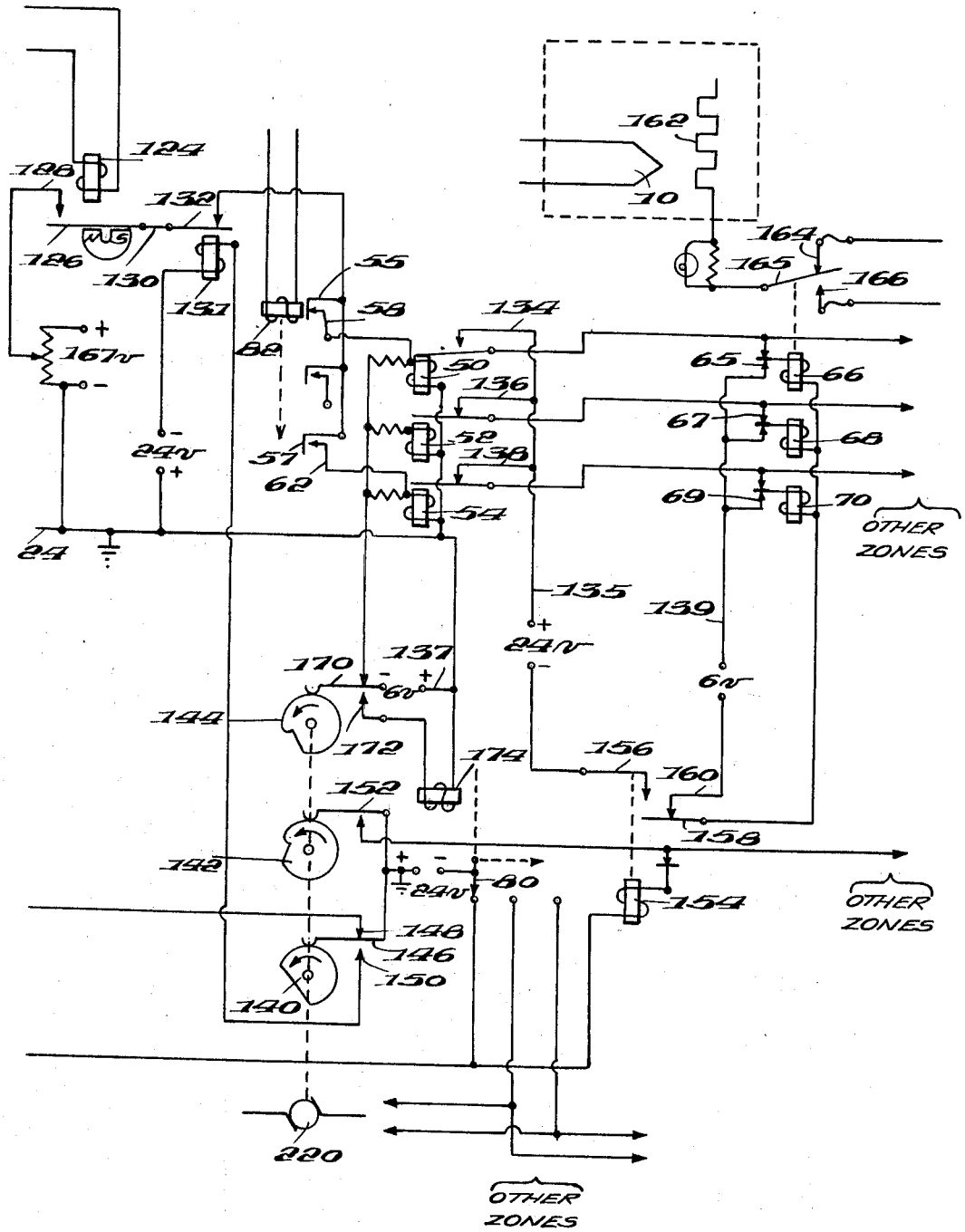

In the accompanying drawings,
FIGURE 1 is a schematic diagram of the over-all control system, showing one complete zone, as well as the tie lines leading to succeeding zones;
FIG. 2 is a wiring diagram of the memory relays and read-out mechanisms shown schematically in FIG. 1;
FIG. 3 is a wiring diagram of the stabilizing circuit of the present invention; and
FIG. 4 is a schematic diagram showing incorporation of the circuit of FIG. 3 into a simplified control system.

System

As shown schematically in FIG. 1, the multi-point condition control system includes a number of zones of individual sensing elements each of which zones is adapted to be coupled by a scanning switch assembly with a common analysis circuit which in turn forwards a control signal through the scanning switch assembly to individual power control relays. In the zone which has been illustrated, three sensing elements 10, 12, 14 are provided with individual set point or adjustment circuits 16, 18, 20 which are connected to a zone adjustment and check circuit 22 through a common lead 23, and with the scanning switch contacts 26, 28, 30 through leads 32, 34, 36. These scanning switch contacts are sequentially coupled with an input chopper 38 through a second set of scanning switch contacts 39, 40, 41. Chopper 38 alternately forwards a sensed signal from one of the elements 10, 12, 14 and a reference signal from generator 42 to an amplification and modulation circuit 44 from which the amplified signals are alternately forwarded to an output chopper 46. The chopped, amplified signals are compared in a control signal generation component 48 which includes a thyratron tube for triggering the memory relays 50, 52, 54 when the scanned signal from the corresponding sensing element indicates a demand for control. Such a control signal is transmitted through one of the contacts 55, 56, 57 to one of the contacts 58, 60, 62 of the output bank which is synchronized with the input bank of the scanner switch assembly. When the moving switch actuators 81, 82 have traveled through the entire zone, a read-out operator 64 functions to transfer simultaneously any signals stored on the memory relays 50, 52, 54 to the associated power relays 66, 68, 70 which in turn control the application of power to the various sensed conditions. Operator 64 also functions to open a series of switches 72, 74, 76, 78 through a zone selector 80. A corresponding set of switches in the succeeding zone is subsequently closed to couple that zone with the scanning switch assembly and analysis circuit in the same manner as and through the tie lines shown in FIG. 1.

In the embodiment chosen for illustration, the sensing elements are iron-constant and thermocouples. The manner in which the outputs of elements 10, 12, 14 are trimmed, calibrated and otherwise adjusted in components 16, 18, 20, 22 has been disclosed in my U.S. Patent 3,272,-012, as have various details of the scanner switch assembly and other components shown schematically in FIG. 1. For present purposes, it suffices to state that, with scanner switch contacts 26, 39 closed, the sensed signal from thermocouple 10 is delivered to components 38, 44, 46, 48 for further processing. Any control signal resulting therefrom is simultaneously forwarded through closed switch 55, 58 to the memory relay 50, switch 55, 58 having been closed by electromagnet 82. If the processed error signal from thermocouple 10 is sufficient to trigger a thyratron tube in component 48, a master relay 124 (FIG. 2) is energized and a relay switch arm 126 makes contact with a control signal source 128. The control signal is transmitted through a lead 130 to the memory matrix, e.g., through switch 55, 58 to relay 50. Switch arm 126 is returned to its normally open position on the next half cycle by the action of a diode in the circuit of component 48.

The DC potential on lead 130 reaches the memory matrix through the normally closed relay switch 132 and the now closed output bank scanner switch 55, 58. Energization of relay 50 opens the normally closed switch 134. With the switch 134 open, a 24 volt circuit 135 to the power relay coil 66 through one-half of a double diode rectifier 65 is broken. The same sequence of events reoccurs as the magnets 81, 82 move from switch to switch. In the absence of a control signal, switches 134, 136, 138 remain closed and the 24 volt control circuit 135 to the power relay coils through rectifiers 65, 67, 69 remains in a ready condition. Once actuated by a control signal, the relay switches 134, 136, 138 remain open by the action of the 6 volt holding circuit 137 connected in parallel with the coils of memory relays 50, 52, 54.

The read-out operator 64 (FIG. 1) which regulates the timing cycle of the scanning operation includes (FIG. 2) a front cam 140, a center cam 142, and a rear cam 144. The front cam 140 reaches its flat portion at the time when a selected zone has been scanned and moves the switch arm 146 from contact 148 to contact 150. With contact 150 closed, the circuit to the relay coil 131 for switch 132 is closed to disconnect the memory matrix from the rest of the system. Simultaneously, the circuit to switches 72, 74, 76, 78 of the scanned zone is opened at contact 148. Center cam 142 actuates a switch arm 152 simultaneously with the movement of switch 146. This closes the circuit to a zone transfer actuator, illustrated as a relay 154, energization of which functions to pivot a switch arm 156 into contact with a pivoted arm 158 and to move the latter away from fixed contact 160. Contact of arm 156 with arm 158 acts to close the 24 volt circuit 135 to the power relay control circuit and thus energizes those power relays still in the ready condition. For example, the 24 volt circuit to the coil of relay 68 would be ready through switch 136 whereas that to relay 66 would be broken by the control signal which energized the memory relay 50 and opened switch 134. In FIG. 2, only relay 66 has been shown coupled to a load, the loads coupled to the relays 68 and 70 having been omitted for purposes of clarity. In this system, the load is an electric heater 162 which is normally connected to a high power contact 164 and which is connected to its low power contact 166 when pulled in by relay 66. Any of the power relays 66, 68, 70 which receive a 24 volt pulse as a result of the energization of transfer relay 154 are held in, when switch 152 moves back to the high portion of cam 142, by the 6 volt holding circuit 139 through then closed contact 160. The rear cam 144 has associated therewith a switch arm 170 which normally closes the 6 volt holding circuit 137 for the memory relays. This switch is moved to its contact 172, subsequently to the movement of switch arms 146, 152, and thus closes the circuit to a relay 174 which functions to index the zone selector switch 80 to the succeeding zone, so that when switch 146 again reaches the high portion of cam 140, a set of switches corresponding to the switches 72, 74, 76, 78 in FIG. 1 will be closed to connect the scanner switch assembly, the analysis circuit and the memory matrix to such succeeding zone, i.e., the scanning operation is transferred to the following zone.

*System operation*

Operation of the disclosed system is initiated by energizing a motor which drives the scanner switch assembly and the polarized synchronous motor 220 which drives cams 140, 142, 144. The other components are energized by suitable connections with their line source or battery. Assuming that the switch 146 is on the high part of cam 140, the relay circuit for switches 72 74, 76, 78 of one zone will be closed. As the magnet 81 passes one of the input bank switches, a circuit is completed from the corresponding sensing element to the control signal generation component 48 wherein the sensed signal is compared with the reference signal from component 42. When the sensed signal is low, indicating a heat requirement at the sensed condition, switch 126 closes momentarily and a control signal passes through the corresponding switch (e.g., switch 58) in the output bank to the associated memory relay (e.g., relay 50). Thus, the signal from sensing element 10 passes through lead 32, switch 72, switch 26, 39, input chopper 38, circuit 44, output chopper 46, trigger circuit 48, and switch 55, 58 to the memory relay 50. The use of both an input and an output chopper with the circuit 44 allows both the reference and sensed signals to pass through the same amplifier so that any drift or weakening of tubes will affect both signals equally. Circuit 44 includes a 60 kc. modulation stage, five stages of RF amplification, a demodulation stage, and further amplification stages. The signals from elements 12, 14 are similarly passed through the system in succession. After the entire zone has been read into the memory matrix, switch 146 of read-out operator 64 reaches the low portion of cam 140 to energize the killer relay 131 and thereby open switch 132. The circuit to switches 72, 74, 76, 78 of the selected zone is also opened at contact 148. Simultaneously, switch 152, associated with cam 142, is closed to energize relay 154 and close switch 156. A 24 volt signal is then sent to the power relay bus through circuit 135 and any of the power relays 66, 68, 70 remaining in the ready condition is energized, i.e., when the heat level of the controlled condition is satisfactory, the associated power relay is energized to pull its switch to the low heat position.

Upon energization, the power relays 66, 68, 70 function to pull in the load switch associated therewith from the high to the low heat position. In FIG. 2, the load switch corresponding to sensing element 10 has been designated by the numeral 165; switch 165 would remain at the high heat position since the 24 volt circuit to power relay 66 is shown broken at switch 134. Assuming that no control signal was received, similar switches associated with the power relays 68, 70 would be pulled into the low heat position and held there by the 6 volt holding circuit 139 when relay 154 is deenergized and switch 158 returns to fixed contact 160 (corresponding to the high portion of cam 142). Switch 170 subsequently reaches the low portion of cam 144 and contact 172 is closed with the result that relay 174 is energized and selector 80 is indexed to the next zone. At the same time, the holding circuit for the memory relays 50, 52, 54 is opened to reset any of the switches 134, 136, 138 which may have been actuated by the presence of a control signal. Thus, switch 134 would be returned to its normally closed position. When switch arm 146 again reaches the high portion of cam 140, a second zone would be connected, through switches corresponding to the switches 72, 74, 76, 78, to the analysis circuit 48 and the reset memory matrix 50, 52, 54.

*Stabilizing circuit*

A preferred embodiment of the stabilizing circuit of the present invention is shown in FIG. 3 as a modification adapted for incorporation into the circuit of FIG. 2 to prevent overshooting the set point or hunting in the system. This stabilizing circuitry includes a pair of oppositely connected, iron-constantan, feed-back thermocouples TC1, TC2 which are connected in series with the iron lead of sensing element 10′. The constantan leads of the thermocouples TC1, TC2 are interconnected, as at 410. The thermocouples are mounted inside porcelain tubes, each of which has a 15 ohm noninductive resistance wound thereon to serve as a heater which is thermally bonded to the tube with a high temperature wax. The two units are separated by a small, free air space to prevent any thermal coupling. The switch arm 165′ is connected to the bus 164′ and normally closes the circuit through a contact 167 which is coupled to electric heater 162′. The noninductive resistance or heater element 412 associated with TC2 is connected with the contact 167 through a resistor 414. The heater element 416 of TC1 is connected to contact 166′ through a resistor 418. When power is being applied to the load 162′ through lead 164′ and contact 167, current also flows through heater 412 to heat TC2 about 10° C. above the ambient temperature. The output voltage of TC2 is added to that of the sensing element 10′ so that the latter will reach the set point e.m.f. slightly in advance of the time the sensed condition reaches the actual set point. A control signal will accordingly be generated and the power relay 66′ will be energized to pull in switch arm 165′ to contact 166′. With arm 165′ on contact 166′, there is a flow of current through the heater element 416 of TC1 and the combined e.m.f. from element 10′ and TC1 lowers the set point in advance of the sensed condition so that power is again applied to the load. In this manner, the feed-back increments from thermocouples TC1, TC2 add negative stability to the system so that no overshooting or hunting can occur.

A simplified system for controlling and stabilizing the heat level in a single enclosure has been shown schematically in FIG. 4. In this system, a thermocouple 85 is thermally associated with an electric heater 86 in an enclosure 87. Heater 86 is supplied from an AC source when switch arm 88 is on heat contact 89. Simultaneously, power is applied to a heater element 90 which is associated with a feed-back thermocouple 91. Upon generation of an error signal indicative of a high temperature in enclosure 87, switch arm 88 is pulled in by a relay 92 and engages contact 93. Power is then applied to heater element 94 which is associated with an oppositely connected feedback sensor 95. Operationally, the stabilizing circuit in this simplified control system is the same as that shown in FIG. 3.

Because of their small size and other desirable properties, thermocouples are used widely as temperature-sensitive devices in the measurement and control of temperatures. Although this disclosure has been more or less limited to such sensors, it is apparent that temperature-sensitive resistances or any other temperature sensitive elements which deliver microvoltage signals may be employed and that elements sensing different types of conditions may also be employed in a multi-point system.

Obviously, many changes, modifications and different adaptations of the disclosed stabilizing circuit will become apparent without departing from the spirit of the present invention which is, therefore, intended to be limited only by the scope of the appended claims.

Having thus described the invention, what is claimed as new and desired to be secured by Letters Patent is:

1. In a control system including a sensing thermocouple, an electric heater, a switch in the circuit of said heater and a switch control device coupled with said thermocouple, anti-hunt means for stabilizing the system, said anti-hunt means comprising a pair of feedback thermocouples in circuit with said sensing thermocouple and a pair of heater elements, each associated with a feedback thermocouple, said switch being pivotable between a first contact in the circuit of said heater and a second contact, each of said heater elements being connected to one of said contacts for influencing the feedback thermocouple associated therewith and thereby including a feedback increment in the signal from the sensing thermocouple.

2. In a control system including an electric heater, a primary temperature sensor associated with the heater, a switch in the circuit of said heater and a switch control device coupled electrically to said primary sensor.

means for stabilizing the system, said means comprising a pair of auxiliary feedback sensors in circuit with said primary sensor and a pair of heater elements, each associated with an auxiliary sensor, said switch being pivotable between a first contact in the circuit of said heater and a second contact, each heater element being connected to a different contact for influencing said primary sensor and thereby including a feedback increment in the signal from said primary sensor.

3. In a control system including an electric heater connected to an AC source and a switch connecting the source to said heater, switch control circuitry, said circuitry comprising a primary temperature sensor thermally associated with said heater, a pair of feedback sensors oppositely connected to the primary sensor and a pair of heater elements, each element being thermally associated with one of said auxiliary sensors and connected to said source, one of said elements being connected to the source through said switch for energization simultaneously with said heater, the other element being connected to the source for energization when the heater is deenergized.

References Cited
UNITED STATES PATENTS

| | | | |
|---|---|---|---|
| 2,138,593 | 11/1938 | Breitenstein | 73—341 X |
| 3,231,719 | 1/1966 | De Viney et al. | 219—497 |
| 3,272,012 | 9/1966 | Seney | 73—341 |

RICHARD M. WOOD, *Primary Examiner.*

ANTHONY BARTIS, *Examiner.*

L. H. BENDER, *Assistant Examiner.*